(12) United States Patent
Santos

(10) Patent No.: US 8,400,320 B2
(45) Date of Patent: Mar. 19, 2013

(54) SYSTEM FOR MONITORING OIL LEVEL AND DETECTING LEAKS IN POWER TRANSFORMERS, REACTORS, CURRENT AND POTENTIAL TRANSFORMERS, HIGH VOLTAGE BUSHINGS AND THE LIKE

(76) Inventor: Eduardo Pedrosa Santos, Atibaia (BR)

( * ) Notice: Subject to any disclaimer, the term of this patent is extended or adjusted under 35 U.S.C. 154(b) by 529 days.

(21) Appl. No.: 12/649,741

(22) Filed: Dec. 30, 2009

(65) Prior Publication Data

US 2011/0156918 A1  Jun. 30, 2011

(51) Int. Cl.
*G08B 21/00* (2006.01)

(52) U.S. Cl. ........ 340/646; 340/501; 340/614; 340/617; 340/626; 340/622

(58) Field of Classification Search ............... 340/618, 340/622; 324/698
See application file for complete search history.

(56) References Cited

U.S. PATENT DOCUMENTS

| | | | | |
|---|---|---|---|---|
| 1,920,037 A * | 7/1933 | Tauber | .............................. | 361/37 |
| 2,704,841 A * | 3/1955 | Van Ryan | ...................... | 340/522 |
| 3,449,633 A * | 6/1969 | Schroeder et al. | .............. | 361/37 |
| 4,201,089 A * | 5/1980 | Felber et al. | ................... | 374/152 |
| 4,654,806 A * | 3/1987 | Poyser et al. | ................. | 700/292 |
| 4,868,547 A * | 9/1989 | Thomas et al. | ............... | 340/646 |
| 5,842,149 A * | 11/1998 | Harrell et al. | ...................... | 702/9 |
| 6,909,349 B1 * | 6/2005 | Longardner et al. | ............ | 336/60 |
| 7,049,922 B2 * | 5/2006 | Sabau | .............................. | 336/55 |
| 7,928,741 B2 * | 4/2011 | Hedges et al. | ................ | 324/698 |
| 2009/0216464 A1 * | 8/2009 | Kong et al. | ...................... | 702/25 |
| 2009/0231075 A1 * | 9/2009 | Moia | ................................ | 336/61 |
| 2010/0313849 A1 * | 12/2010 | Stoner et al. | ................... | 123/350 |

FOREIGN PATENT DOCUMENTS

JP   05283240 A  * 10/1993

\* cited by examiner

*Primary Examiner* — Daniel Wu
*Assistant Examiner* — Son M Tang
(74) *Attorney, Agent, or Firm* — McKee, Voorhees & Sease, P.L.C.

(57) ABSTRACT

System for monitoring oil level and detecting leaks in power transformers, reactors, current and potential transformers, high voltage bushings and the like, notably for a system that through the use of sensors and other electronic components measures and monitors transformers and similar equipment in real time, filled with insulating oil, with greater precision and without need for floats or mobile mechanical parts, while presenting countless facilities in the sense of making level monitoring more reliable and safer, highlighting the level error calculations, oil leak detection alarm, excess oil detection alarm during the equipment filling process and calculation of tendencies of evolution for levels among other facilities.

24 Claims, 4 Drawing Sheets

SYSTEM FOR MONITORING OIL LEVEL AND DETECTING LEAKS IN POWER TRANSFORMERS, REACTORS, CURRENT AND POTENTIAL TRANSFORMERS, HIGH VOLTAGE BUSHINGS AND THE LIKE

FIELD OF THE INVENTION

This petition for a patent is for an original "SYSTEM FOR MONITORING OIL LEVEL AND DETECTING LEAKS IN POWER TRANSFORMERS, REACTORS, CURRENT AND POTENTIAL TRANSFORMERS, HIGH VOLTAGE BUSHINGS AND THE LIKE"; namely a system that uses sensors and other electronic components to measure and monitor, in real time, transformers and similar equipment filled with insulating oil with greater precision and without any need for floats or other movable, mechanical parts, while also presenting countless facilities in terms of making level monitoring more reliable and safer, highlighting level error calculations, an alarm when detecting oil leaks, or detecting excess oil during the equipment filling process and the calculation of tendencies of evolution for levels, among other facilities.

BACKGROUND OF THE INVENTION

Power transformers and reactors are pieces of equipment widely used in medium, high and extra-high voltage electric power generation, transmission and distribution systems. These devices frequently use for insulation and heat removal some type of oil, which can be mineral (petroleum byproduct), vegetal (from soy bean, sunflower or other) or silicon, for example.

Transformers and reactors have copper coils that are wrapped in paper. The entire active part—comprised of a core and coils—is then immersed in insulating oil to impregnate the paper and thus ensure the electric isolation of the assembly, and to cool the coils with the oil circulating in heat radiators.

Thus, for safe operation of the equipment, it is essential for the active part to be permanently immersed in insulating oil. However, temperature variations during equipment operation due to variations in ambient temperature and heating caused by the electric current, make the oil dilate and contract, thus making its volume vary and increasing and reducing oil level.

In order to guarantee the active part is permanently immersed in insulating oil during all operating conditions, the transformer or reactor is equipped with an oil expansion tank, also called a conservation tank, installed above the equipment's main tank and connected to it by piping. The function of the conservation tank is to provide room for the oil level to vary in its interior, rising with increases in temperature and falling with decreases. The volume of the conservation tank is calculated in such a manner that the main tank, where the active part is located, will always be completely full of oil, even at the lowest temperatures, and the oil will never overflow, even at the highest expected temperatures.

Therefore, given the importance of oil level for safe operation of the equipment, it is necessary to continuously measure it in order to readily detect any level lower than minimum tolerances, thus preventing a short circuit due to lack of oil in the active part, and to warn of environmental contamination with oil due to eventual leaking. Likewise, measuring the oil level permits detecting higher than expected levels due to filling equipment with excess oil; for example, warning of overflow risks and contamination of the environment.

In modern transformers and reactors, the expansion tank is also equipped with a rubber membrane or bag that impedes the oil's direct contact with the air; however, without impeding any variation in oil level, since the membrane or bag is flexible, rising and falling in accordance with the oil level. The upper part of the rubber membrane or bag is in contact with the external environment through air piping and an air dehumidifying mechanism. This avoids pressure or vacuum in the equipment tank due to expansion or contraction of oil.

In the current state of the art, the oil level measuring system is comprised of an oil level indicator that operates using a float located in the lower part of the rubber membrane or bag, so that the float rises and falls accompanying the movement of the membrane or bag, which in turn accompanies the increase or reduction in oil level. The float is coupled to an oil level indicator by a rod that moves a mechanism, which in turn activates the pointer, indicating current oil level at a graduated scale.

This arrangement can be observed for example in U.S. Pat. Nos. 7,191,648 and 6,708,562.

When the oil level reaches critical conditions, such as low, very low, high or very high levels, movement of the mechanism closes one or more electrical contacts, which are used to activate a visual or sonorous alarm in the installation control room.

The state of the art for the oil level indication system presents some disadvantages observed in practice, which are:

Because it is a mechanically activated system, it is subject to mechanical failures such as jamming of the mechanism;

In order to prevent mechanical failures, it is necessary to have preventive maintenance for lubrication, for example;

With the up and down movement of the oil level, the rubber of the membrane or bag may present undulations or folds in which the float may get caught, leading to the imprecise indication of oil level;

In extreme cases, the above described fact may cause the float and/or its rod to perforate the membrane or bag, putting the oil in contact with oxygen and humidity in the air and causing the accelerated aging of the isolation paper on the coils by oxidation and hydrolysis;

Leak detection cannot be conducted immediately since the loss of oil to the environment may be masked by an increase in level due to temperature increases, so the alarm contacts for low levels will only be activated after a considerable volume of oil has been disposed of in nature;

Likewise, detection of a transformer that has been overfilled with oil cannot be done immediately since the existence of excess oil can be masked by the reduction in oil level due to low temperatures when the transformer is shut off. Thus, the contacts will only be activated some time after the transformer has been energized, when the temperature rises, causing the forced shut down of the equipment for removal of oil or the leaking of excess oil into the environment.

SUMMARY OF THE INVENTION

Aware of the state of art, its inconveniences and limitations, the inventor, active in the segment of matters in hand, studies and research, created the "SYSTEM FOR MONITORING OIL LEVEL AND DETECTING LEAKS IN POWER TRANSFORMERS, REACTORS, CURRENT AND POTENTIAL TRANSFORMERS, HIGH VOLTAGE BUSHINGS AND THE LIKE" in question, which makes the real time measuring and monitoring of oil levels in transformers and similar equipment filled with isolation oil more reliable and without the use of floats and mechanical parts, solving the current deficiencies amply referred to and illustrated in the state of the art.

The oil monitoring system in question has the following advantages in relation to the state of the art:
- Since it does not have moving mechanical parts, problems associated with mechanical failure and maintenance needs are eliminated;
- Since it does not have a float or other parts in contact with the rubber membrane or bag, the risk of the level measuring system to damage or perforate those items is eliminated;
- Greater precision in measuring the oil level since it does not use a mechanical system;
- Able to integrate with other already existing protection or monitoring equipment in the transformer or reactor, such as the gas accumulation relay (buchholz relay) and temperature monitor, reducing costs and facilitating installation and maintenance;
- Improved monitoring of eventual oil leaks, permitting their detection even before the oil level reaches the minimum limit. It thus provides less risk of failure for the transformer or reactor and a reduction in environmental impact in case of a leak;
- Permits detecting excess filling of the transformer or reactor with oil, even if the oil level does not reach the maximum limit due to low temperature.

BRIEF DESCRIPTION OF THE FIGURES

The invention will now be explained in detail through the drawings listed below.

DETAILED DESCRIPTION OF THE PREFERRED EMBODIMENTS

Figure 1:
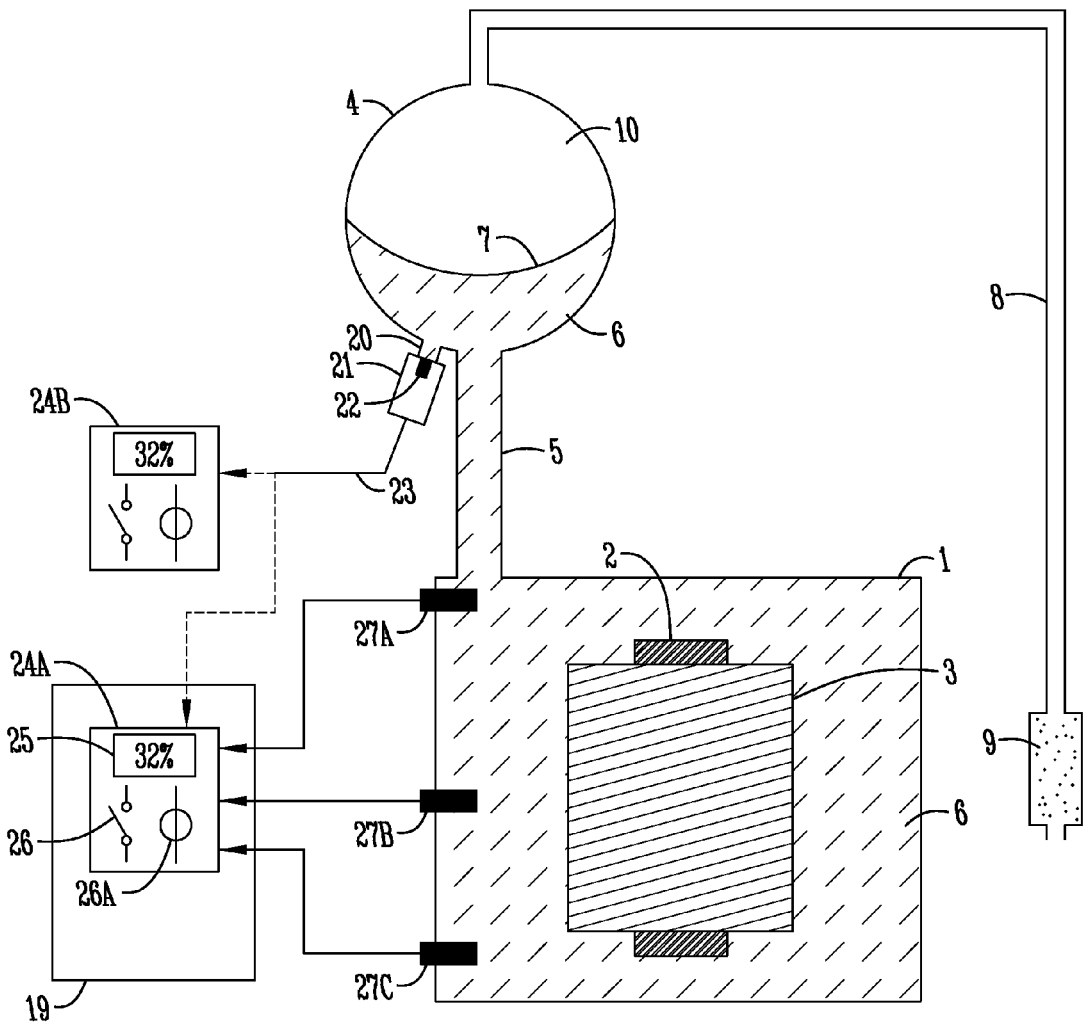
FIG. 1—Schematic view of the newly invented monitoring system applied in a transformer.

The "SYSTEM FOR MONITORING OIL LEVEL AND DETECTING LEAKS IN POWER TRANSFORMERS, REACTORS, CURRENT AND POTENTIAL TRANSFORMERS, HIGH VOLTAGE BUSHINGS AND THE LIKE", for measuring and monitoring insulating oil levels of transformers and similar equipment, using an oil level monitor (24A, 24B) to which a pressure sensor (21), to measure internal oil column pressure (6), and a temperature sensor (22), arranged to measure oil temperature (6) in the expansion tank (4), are connected, so that the level monitor (24A, 24B) calculates oil column height, which corresponds to the oil level, from the oil pressure and takes into account the change in oil density with temperature, precisely indicating the oil level (6) on the display (25).

The system, as shown in FIG. 1, is comprised of an electronic pressure sensor (21) installed in an access opening (20), which normally already exists in the lower part of the expansion tank (4) for draining. The sensor (21) measures oil pressure (6) at access opening (20) in relation to atmospheric pressure. Since the air (10) in the expansion tank (4) is also at atmospheric pressure, by means of the piping (8), the pressure measured by the sensor (21) equals the oil column pressure (6) in the expansion tank (4). Therefore, the measurement from the pressure sensor (21) is proportional to the oil level (6), which permits measuring the level without using floats or any mechanical parts.

The signals (23) from pressure (21) and temperature (22) sensor measurements are then taken to a level monitor (24A) located in the transformer control panel (19) or a level monitor (24B) located in the expansion tank (4), adjacent to the pressure and temperature sensors (21, 22), so that it can form a mechanical unit with them.

Figure 2:
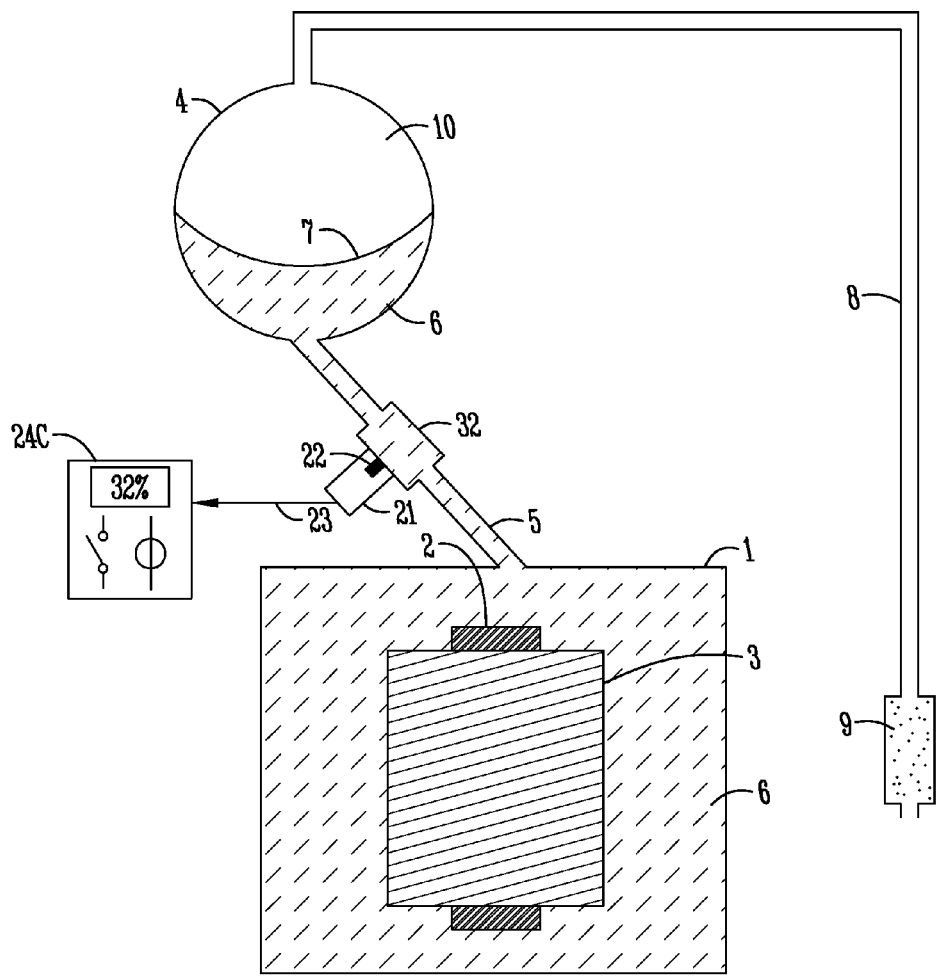
FIG. 2—Schematic view of the newly invented monitoring system applied in a transformer with a gas accumulation relay attached.

As shown in FIG. 2, the gas relay (32), also called a Buchholz relay, is installed in the piping (5) that connects the transformer tank (1) and the expansion tank (4). The gas relay (32) permits oil (6) to pass through it, aimed at collecting eventual gas bubbles in the oil. Since the gas relay (32) is in direct contact with the oil (6) and is installed near the expansion tank (4), the oil level monitor (24C) can be integrated to the gas relay (32), with the pressure sensor (21) installed in the gas relay (32) and in contact with the oil, just like the temperature sensor (22).

With the information from the pressure (21) and oil temperature (22) sensors in the tank (4), the level monitor (24A, 24B) corrects the measured pressure value considering the change in oil (6) density with its temperature, thus obtaining the correct height of the oil column (6) and consequently, the exact level of oil (6), which is indicated on the display (25) of the level monitor (24A, 24B). The display (25) can show the oil level information in numerical as well as bar graph format to permit easy visualization from a distance.

The level monitor permits the user to program upper and lower limits for the oil level. If the level falls below the lower limit, the level monitor generates a low oil level alarm. Likewise, if the level goes above the upper limit, the level monitor generates a high oil level alarm. The alarms generated may activate one or more electrical alarm contacts (26) depending on the contact (26) selection programmed previously by the user for each of the alarms individually, which may be used by the user to activate a visual or sonorous alarm in the installation's control room (not represented).

As explained, the expansion and contraction of insulating oil occurs as a result of changes in temperature, so that, if there are no leaks, the oil level (6) in the expansion tank (4) will be determined by the oil temperature along the height of the transformer tank (1). Since oil temperature (6) changes at each different point along tank (1) height, the level monitoring system described has several temperature sensors (27A, 27B, 27C), in various numbers, distributed along tank (1) height, which are connected to oil level monitor inputs (24A, 24B). Using these temperature measurements, the level monitor (24A, 24B) calculates temperature distribution along the entire transformer tank (1), even in locations where no temperature sensors have been installed, through interpolation and/or extrapolation, using mathematical functions that can be selected from among linear, polynomial and exponential types, among others. With the distribution of temperatures along the tank (1), the level monitor (24A, 24B) calculates oil expansion or contraction (6) along the tank (1), thus obtaining the expected oil level in the expansion tank (4).

Since the installation of a large number of oil temperature sensors (27A, 27B, 27C) along the transformer tank (1) may not be feasible in practice, the level monitor (24A, 24B) permits the installation of only 2 oil temperature sensors at different heights of the tank (1), then calculates the temperatures at the intermediate heights between sensors by interpolation and calculates the temperatures above the highest sensor (27A) and below the lowest sensor (27C) by extrapolation. The mathematical functions of interpolation and extrapolation used by the level monitor may be selected from among the linear, polynomial and exponential types, among others.

Figure 3:
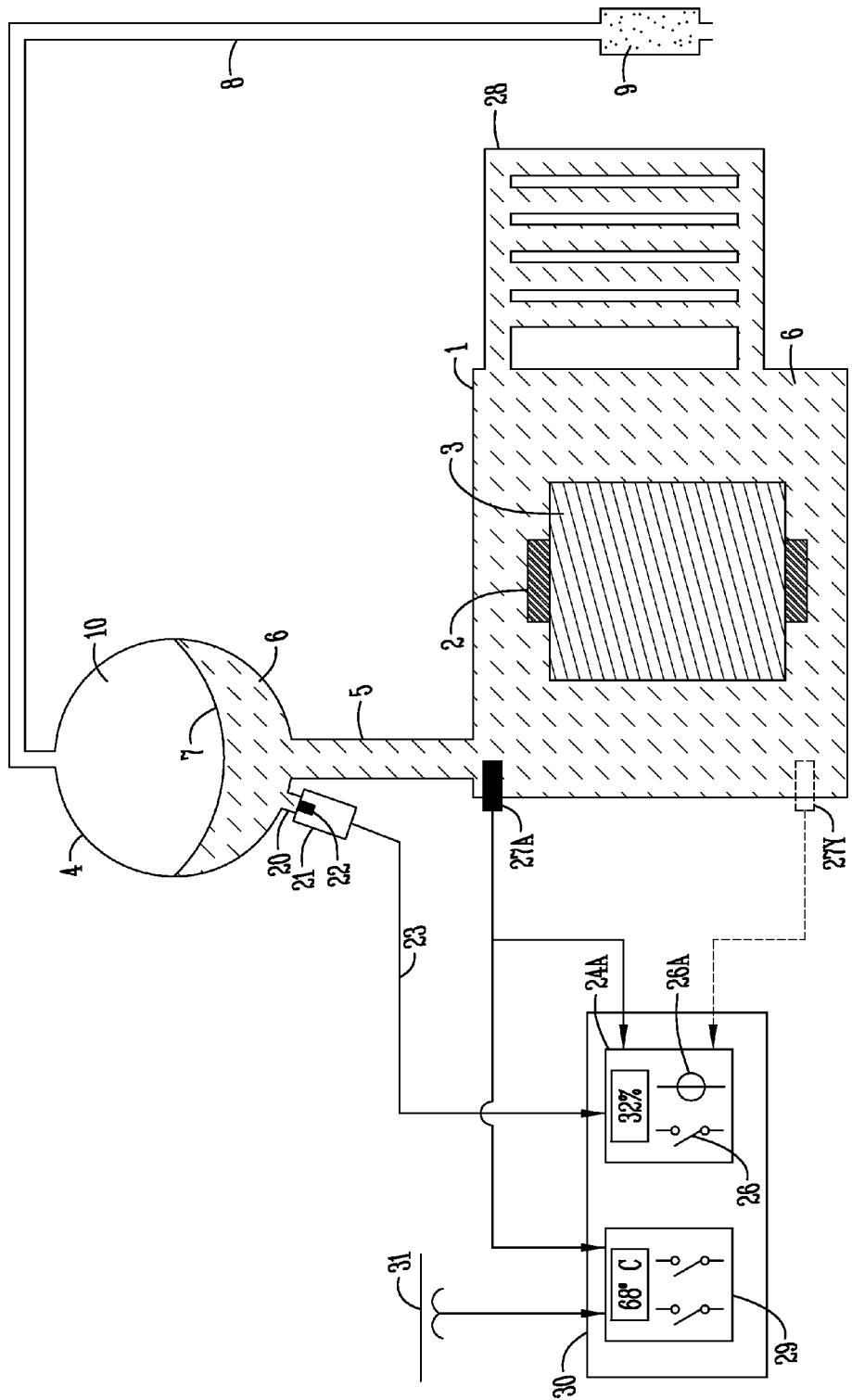
FIG. 3—Schematic view of the newly invented monitoring system applied in a transformer with only one or two temperature sensors in the main tank.

In applications where only one temperature sensor (27A) is available at the top of transformer tank oil (1), as shown in FIG. 3, the level monitor (24A) can calculate the temperature at the bottom of the tank (1) by measuring the temperature of the available sensor (27A), of the current that circulates through the transformer, measured by a current transformer (31), and characteristics the transformer cooling system radiators (28), thus obtaining a "virtual temperature sensor" (27V) for the bottom of the tank (1). With the information from the real temperature sensor (27A) and the "virtual sensor" (27V), the already described mathematics interpolation processes can be used to interpolate and extrapolate temperatures along tank height (1). This possibility is especially interesting when considering that oil temperature measurement (27A) at the top of the tank (1) and from the current transformer (31) are already available in temperature monitors (29) that normally equip power transformers, which permits the integration of oil level monitor (24A) and transformer temperature monitor (29) functions in the same monitoring system.

The oil level monitor (24A, 24B) then calculates the difference between the real oil level, obtained from pressure (21) and temperature (22) sensors, and expected oil level, calculated from temperature sensors (27A, 27B, 27C) in the tank (1), with the difference called Level Error. The level monitor permits the user to program upper and lower limits for the Level Error. If the Level Error falls below the lower limit, the level monitor generates a low oil level alarm. Likewise, if the Error Level goes above the upper limit, the level monitor generates a high oil level alarm. The alarms generated may activate one or more electrical alarm contact (26) depending on the contact (26) selection programmed previously by the user for each of the alarms individually.

Given that the Level Error is subject to oscillations over time, caused by imprecision inherent to sensors (21, 22, 27A, 27B, 27C), the level monitor calculates the Level Error's average in a moving window with a time frame that can be adjusted by the user. The result is called Average Level Error. The level monitor permits the user to program upper and lower limits for the Average Level Error. If the Average Level Error falls below the lower limit, the level monitor generates a low oil level alarm Likewise, if the Average Error Level goes above the upper limit, the level monitor generates a high oil level alarm. The alarms generated may activate one or more electrical alarm contact (26) depending on the contact (26) selection programmed previously by the user for each of the alarms individually.

Alternatively, with the temperature distribution along the tank (1) height, obtained from the interpolation and extrapolation processes described above, the level monitor (24A, 24B) continuously calculates the oil level in the expansion tank (4) if the oil is at a uniform temperature, equal to a reference temperature scheduled by the user, such as 25° C., and where this result is called the Standardized Level. The level monitor permits the user to program upper and lower limits for the Standardized Level. If the Standardized Level falls below the lower limit, the level monitor generates a low oil level alarm. Likewise, if the Standardized Level goes above the upper limit, the level monitor generates a high oil level alarm. The alarms generated may activate one or more electrical alarm contact (26) depending on the contact (26) selection programmed previously by the user for each of the alarms individually.

Given that the Standardized Level is subject to oscillations over time, caused by imprecision inherent to sensors (21, 22, 27A, 27B, 27C), the level monitor calculates the Standardized Level's average in a moving window with a time frame that can be adjusted by the user. The result is called the Average Standardized Level. The level monitor permits the user to program upper and lower limits for the Average Standardized Level. If the Average Standardized Level falls below the lower limit, the level monitor generates a low oil level alarm. Likewise, if the Average Standardized Level goes above the upper limit, the level monitor generates a high oil level alarm. The alarms generated may activate one or more electrical alarm contact (26) depending on the contact (26) selection programmed previously by the user for each of the alarms individually.

Since one of the main purposes of a level monitoring system is to detect oil loss from leaks into the environment, and considering that leaks with little oil flow may persist over a long time before any of the aforementioned alarm limits are reached, the level monitor (24A, 24B) calculates the tendencies of evolution by unit of time for the Level Error, Average Level Error, Standardized Level and Average Standardized Level parameters. From the calculated tendencies of evolution, and supposing that the same remain constant, the level monitor (24A, 25B) calculates the number of days left for each of these parameters to reach their own lower limit. The level monitor permits the user to program a lower limit, in days, for the number of calculated days remaining. If any of these is less than or equal to the programmed limit, the level monitor (24A, 24B) generates an alarm by tendency or reduction in the oil level, which activates one or more electrical contacts (26) according to the selection of contacts (26) previously programmed by the user for each of the alarms individually.

In order to permit the remote indication of Oil Level, Error Level, Average Error Level, Standardized Level and Average Standardized Level information, as well as tendencies of evolution in these same parameters in the installation's control room or SCADA type supervisory systems, the level monitor (24A, 24B) has analog outputs (26A). These analog outputs (26A) can adopt a current output standard, such as 0 to 1 mA; 0 to 5 mA; 4 to 20 mA or others, or a standard voltage standard, such as 0 to 1V; 0 to 5V; 0 to 10V or others. The starting and ending values for analog output scales (26A) can be programmed by the user, according to the variable being indicated by the output; for example, if the output is 4 to 20 mA and it is indicating oil level, the beginning of the scale can correspond to a level of 0%, generating a 4 mA signal at the output, and the end of the scale can correspond to a level of 100%, generating a signal of 20 mA at the output.

Figure 4:
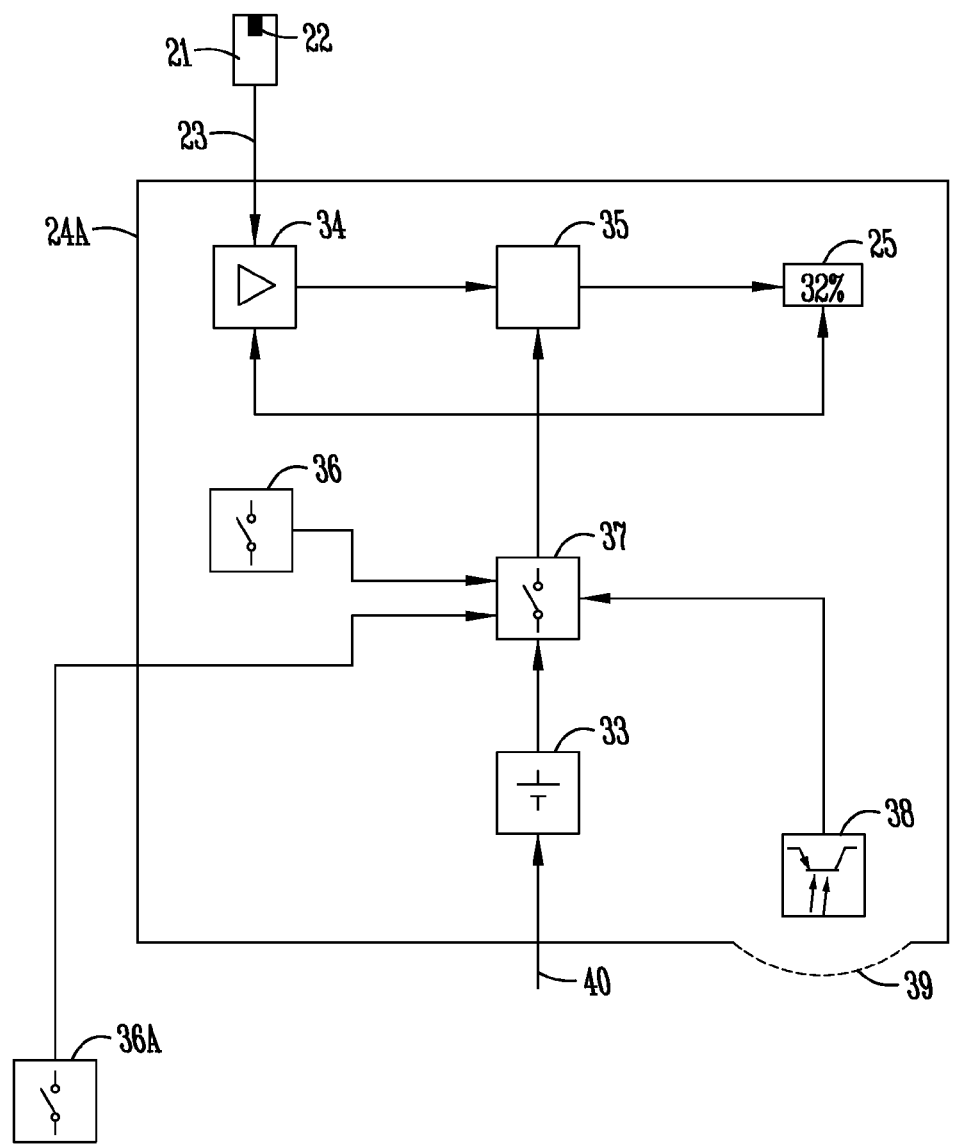
FIG. 4—Electric diagram showing oil level measurement and indication without availability of auxiliary power supply.

In certain situations, it may be necessary for oil level measurement and indication to be available without any auxiliary power voltage (40) available for the level monitor (24A, 24B). This is the case, for example, during the transformer filling process with oil, when the electrical connections that would take power to the level monitor (24A, 24B) are not yet available. In order to permit operation in this situation, as shown in FIG. 4, the level monitor (24A) is equipped with an energy accumulator device (33) that may be a battery, a supercapacitor or other, with sufficient charge to operate the pressure (21) and temperature (22) sensors, as well as the reading circuits for these sensors (34), the microcontroller (35) and display (25). In order to maximize the duration of the energy accumulated in the accumulator device (33), the level monitor (24A) normally remains turned off and out of operation.

Whenever it is necessary to measure the level, the user can request the measurement by activating the button (36) on the level monitor (24A). By activating the button (36) a timing circuit is triggered (37) that sends power to the sensors (21, 22), the reading circuit (34), the microcontroller (35) and the display (25) for just enough time for the user to make the reading, automatically turning off these same elements after just a few seconds. The accumulator (33) is dimensioned so that it has sufficient energy for a large number of readings, and for enough time so that auxiliary power can be brought by cables to the level monitor (24A).

However, there are applications where the level monitor is installed out of user reach, along ground level, as shown in FIGS. 1 and 2, in which the level monitor (24B, 24C) is near the expansion tank (4) or integrated to the gas relay (32). As shown in FIG. 4, for these applications, the activation button (36A) can be installed separately from the level monitor (24A), so that it can be reached by the user at the ground level.

Alternatively, the level monitor (24A) can be equipped with a device for remote activation, without contact, consisting of a photo-detector (38) installed and pointing in the direction of the ground, so that when excited by a beam of light sent by the user, by means of a flashlight, for example, it sends an electric signal to the timing circuit (37), which then begins to operate in an identical manner as when activated by the button (36). In order to avoid improper activation, a light filter (39) is installed in front of the photo-detector (38), in a manner that permits the photo-detector (38) to be excited only by light of a predetermined wavelength, such as infrared, for example, and blocking out all other wavelengths.

Other remote activation systems, without contact, can be employed in replacement of the photo-detector (38), such as audible or inaudible sounds, radiofrequency waves, laser beams, visible or invisible light or others, which will operate in a similar manner, allowing the user to send a request from a distance.

What is claimed is:

1. A system for monitoring oil level and detecting leaks in a power transformer, the system comprising: an oil level monitor to which a pressure sensor is installed at an access opening in a lower part of an expansion tank to measure internal oil column pressure, and a temperature sensor, arranged in a manner to measure oil temperature in the tank; the level monitor calculating oil column height, which corresponds to oil level, from the oil column pressure taking into account a change in oil density with temperature, the oil level monitor further obtaining a precise oil level and indicating it on a display; the level monitor generating a low level alarm when a programmed lower limit is reached or a high level alarm when a programmed upper level has been reached.

2. The system according to claim 1 wherein the level monitor presents oil level information on a display in numerical as well as bar graph format to permit easy visualization from a distance.

3. The system according to claim 1, wherein the pressure sensor and the temperature sensor are installed a gas accumulation relay, in contact with the oil, thereby permitting integration of oil level monitoring and gas accumulation monitoring in the same system.

4. The system according to claim 1 wherein the level monitor is in a control panel with a cabinet attached to a transformer wall.

5. The system of claim 1, wherein the level monitor is in the expansion tank, adjacent to the pressure and temperature sensors, forming a mechanical unit with them.

6. The system of claim 1, wherein the level monitor is integrated to a gas accumulation relay.

7. The system according to claim 1, wherein the oil level monitor has inputs to connect several temperature sensors distributed along a height of a transformer tank and is adapted to use temperature measurements from the temperature sensors to calculate a distribution of temperatures along the entire transformer tank, the level monitor being adapted to calculate the expansion or contraction of the oil along the tank using the distribution of temperatures along the tank, thus obtaining the expected oil level in the expansion tank.

8. The system according to claim 7, wherein using an expected oil level, the oil level monitor can calculate a Level Error by a difference between a real oil level and the expected oil level, generating a low oil level alarm if the Level Error is less than a lowest programmed limit, or a high oil level alarm if the Level Error is greater than a programmed upper limit.

9. The system according to claim 8, wherein the oil level monitor calculates tendencies for evolution by unit of time for the Level Error parameter, and uses these tendencies of evolution calculate the number of days remaining for this parameter to reach its lower limit; the level monitor permits programming a lower limit, in days, for the number of days remaining calculated by the tendencies of evolution, generating an alarm for a tendency for reduction in oil level if any of the days remaining is less than or equal to the minimum limit.

10. The system according to claim 7, wherein the oil level monitor can calculate an Average Level Error by a moving window average of the Level Error in a window of time that can be adjusted by a user, generating a low oil level alarm if the Average Level Error is less than the lowest programmed limit, or a high oil level alarm if the Average Level Error is greater than the programmed upper limit.

11. The system according to claim 7, wherein the oil level monitor permits the installation of an upper and a lower oil temperature sensors at different heights of the tank, and further wherein the oil level monitor calculates temperatures at intermediate heights between the sensors using interpolation and calculates temperatures above the upper sensor and below the lower sensor by extrapolation.

12. The system according to claim 7, wherein the oil level monitor permits the installation of one temperature sensor at a top of the transformer tank and calculates the temperature at a bottom of the transformer tank by measuring the temperature of the one sensor, measuring a current that flows through the transformer, measured using a current transformer, and using the characteristics of the radiators in the transformer's cooling system, thus obtaining a virtual temperature sensor at a lower part of the tank; with the information from the one and virtual temperature sensors being used to interpolate and extrapolate the temperatures along the height of the tank.

13. The system according to claim 12, wherein oil level monitor is integrated with the temperature monitor in order to use the information from the one oil temperature sensor and the current transformer, permitting the integration of oil level monitor and transformer temperature monitor functions in the same monitoring system.

14. The system according to claim 7, wherein the oil level monitor uses a temperature distribution along the height of the tank to continuously calculate a Standardized Level, which corresponds to the oil level that would exist in the expansion tank if the oil was at a uniform temperature and equal to a reference temperature programmed by the user, generating a low oil level alarm if the Standardized Level is less than a lowest programmed limit, or a high oil level alarm if the Standardized Level is higher than a programmed upper limit.

15. The system according to claim 14, wherein the oil level monitor calculates an Average Standardized Level by a moving window average of the Standardized Level in a window of time that can be adjusted by the user, generating a low oil level alarm if the Average Standardized Level is less than the lowest programmed limit, or a high oil level alarm if the Average Standardized Level is higher than the programmed upper limit.

16. The system according to claim 1, wherein the oil level monitor permits selecting electric contacts to be activated when there is an incident involving low oil level, high oil level or tendency for reduction in oil level alarms, and wherein programming is done individually for each of the alarms listed.

17. The system according to claim 1, wherein the oil level monitor permits selecting which parameters from among Oil Level, Level Error, Average Level Error, Standardized Level and Average Standardized Level options, as well as tendencies for evolution of these same parameters, will be indicated for each of a plurality of analog outputs; the oil level monitor allowing programming of beginning and end of scale values for the analog outputs, according to the parameter being indicated by the analog output.

18. The system according to claim 1, wherein the oil level monitor, is equipped with an energy accumulator device, with sufficient charge to permit the operation of pressure and temperature sensors, as well as reading circuits for these sensors, for a microcontroller and for a display, enabling oil level measurement and indication to be available when the level monitor is without auxiliary power voltage.

19. The system according to claim 18, wherein the level monitor normally remain is turned off and out of operation in order to maximize a duration of accumulated energy in the accumulator device, wherein a user can request a measurement of the oil level by activating a button in the level monitor; wherein when this button is activated it triggers a timing circuit, that sends power to the sensors, the reading circuit, the microcontroller, and the display just long enough for the reading to be made by the user, and turns off these same elements automatically after a few seconds; the accumulator device being dimensioned so that its energy will be sufficient for a large number of level monitoring readings.

20. The system according to claim 19, wherein the activation button is installed separately from the level monitor, in a location that can be reached by the user at ground level.

21. The system according to claim 19, wherein the level monitor has a photo-detector that points towards the ground, so that when excited by a beam of light sent by the user, it sends an electric signal to a timing circuit, which then begins to operate in an identical manner as when the button is activated, permitting remote activation, without contact.

22. The system according to claim 21, wherein a light filter is installed in front of the photo-detector, that permits the photo-detector to be hit only by light of a predetermined wavelength and blocking the passage of other wavelengths, thus avoiding improper activations of the timing circuit.

23. The system according to claim 18, wherein a remote, no contact, activation system sends an electric signal to a timing system that sends power to the pressure sensors, temperature sensors, a reading circuit, the microcontroller and the display long enough for a reading to be made by a user and turns off these same elements automatically after a few seconds.

24. The system of claim 23, wherein the remote no contact activation system is chosen from the group consisting of: audible or inaudible sound waves, radio frequency waves, laser beams, and visible or invisible light.

* * * * *

UNITED STATES PATENT AND TRADEMARK OFFICE
CERTIFICATE OF CORRECTION

PATENT NO. : 8,400,320 B2  
APPLICATION NO. : 12/649741  
DATED : March 19, 2013  
INVENTOR(S) : Eduardo Pedrosa Santos Page 1 of 1

It is certified that error appears in the above-identified patent and that said Letters Patent is hereby corrected as shown below:

In the Claims:

Col. 7, Claim 3, Line 58:
ADD after installed --in--

Col. 7, Claim 4, Line 63:
DELETE after panel "with"
ADD after panel --within--

Signed and Sealed this
Fourteenth Day of May, 2013

Teresa Stanek Rea
*Acting Director of the United States Patent and Trademark Office*